April 14, 1931. W. N. BOOTH 1,800,883
VEHICLE WHEEL HUB AND BRAKE DRUM ASSEMBLY
Filed Dec. 27, 1927 2 Sheets-Sheet 2
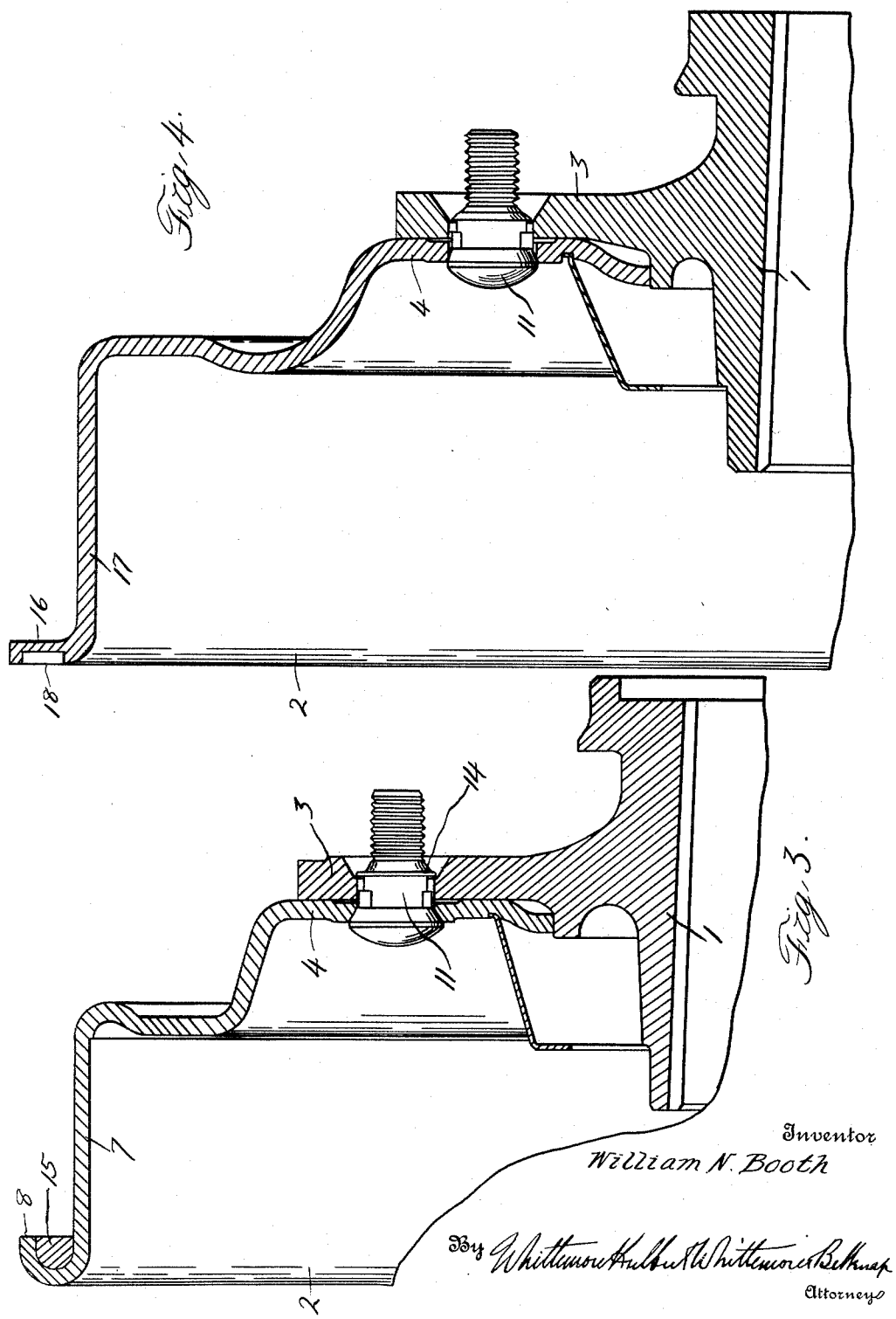
Inventor
William N. Booth
By Whittemore Hulbert Whittemore Belknap
Attorneys Patented Apr. 14, 1931

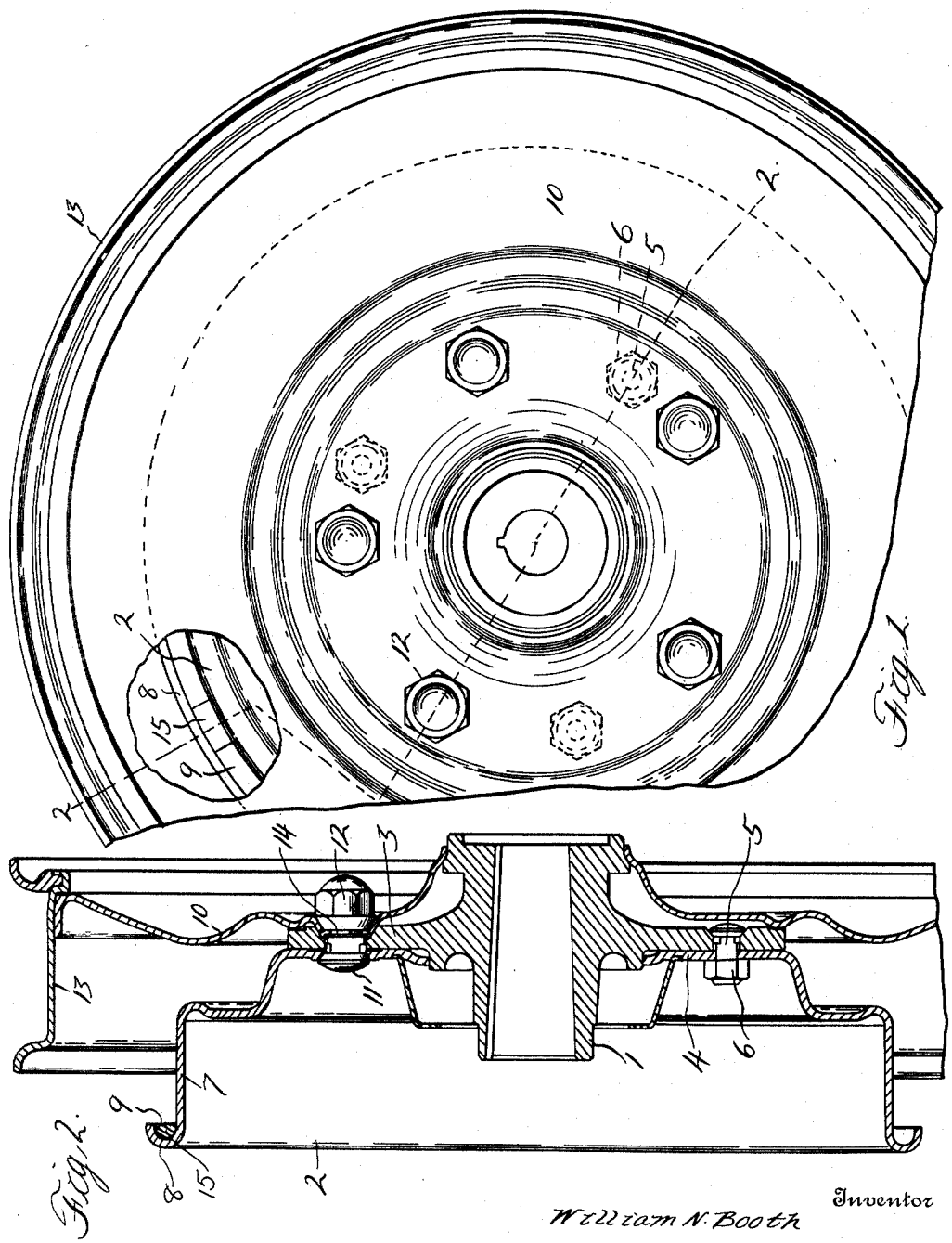

1,800,883

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

VEHICLE WHEEL HUB AND BRAKE-DRUM ASSEMBLY

Application filed December 27, 1927. Serial No. 242,768.

The invention relates to vehicle wheels and refers more particularly to vehicle wheel hub and brake drum assemblies upon which demountable wheel bodies may be mounted. One of the objects of the invention is to balance the hub and brake drum assembly independently of the demountable wheel body, which latter is balanced, so that when the wheel body and rim assembly is mounted upon the hub and brake drum assembly the complete wheel is balanced. Other objects of the invention reside in the novel features of construction and combinations and arrangements of parts as more fully hereinafter set forth.

In the drawings:—

Figure 1 is a front elevation, partly broken away, of a vehicle wheel embodying my invention;

Figure 2 is a cross section on the line 2—2 of Figure 1.

Figure 3 is a similar view of the vehicle wheel hub and brake drum assembly;

Figure 4 is a similar view of a modified vehicle wheel hub and brake drum assembly.

The vehicle wheel is of that type in which the wheel hub and brake drum form a unit assembly and the wheel body is detachably mounted upon the assembly. As shown in the drawings, 1 is the wheel hub and 2 is the brake drum, which is permanently secured to the hub and forms a unit assembly therewith. The hub has the fixed radially extending flange 3 and the brake drum has the web 4, which latter is clamped against the rear face of the fixed flange by means of the bolts 5 and nuts 6. The brake drum has the brake flange 7 and the curled flange 8 at the rear edge of the brake flange for reinforcing the latter and preventing chattering upon application of the brake. This reinforcing flange is curled and extends outwardly and forwardly to form an annular recess 9.

The demountable wheel body in the present instance is formed by the disk 10, which is detachably secured to the hub and brake drum assembly by means of the bolts 11 and nuts 12. 13 is the tire carrying rim, which, in the present instance, is of the solid base type and permanently secured to the peripheral portion of the disk. The disk and rim assembly is balanced. The bolts 11 are preferably permanently secured to the hub and brake drum assembly as by means of the peened over flange 14 upon the shanks of the bolts, which cooperate with the heads of these bolts to secure the same from accidental disengagement.

To balance the hub and brake drum assembly, I have provided counterbalancing weights which are preferably made arcuate along their lengths and have semi-circular faces for engaging in the recess 9 and fitting the curled reinforcing flange 8. As shown, 15 is such a weight which is preferably arc-welded to the reinforcing flange, this weight being of a size to counterbalance the hub and brake drum assembly, which is separately shown in Figure 3. However, it is apparent that if it is found desirable or necessary other weights may be secured in place to balance the assembly. By reason of this arrangement, the reinforcing flange assists in holding the weight or weights in place, inasmuch as it has portions radially outward and inward from the weight or weights. Furthermore, this reinforcing flange with the wheel body conceals the weight or weights.

In the modification shown in Figure 4, the hub and brake drum assembly is in general the same as that shown in the other views. However, this hub and brake drum assembly has the radially extending annular flange 16 at the rear edge of and reinforcing the brake flange 17 of the brake drum and for balancing the assembly the rear face of this reinforcing flange has sufficient metal removed therefrom at one or more points 18 to place the assembly in balance, there being sufficient metal left in the reinforcing flange to make the latter sufficiently rigid and strong to carry out its functions.

What I claim as my invention is:

1. In a vehicle wheel hub and brake drum assembly, the combination of a hub and a brake drum secured to said hub and having a brake flange and a flange for reinforcing said brake flange constructed to balance the assembly.

2. In a vehicle wheel hub and brake drum assembly, the combination of a hub, a brake drum secured to said hub and having a brake flange and a flange for reinforcing said brake flange, and means for balancing the assembly, including a weight secured to said reinforcing flange.

3. In a vehicle wheel hub and brake drum assembly, the combination of a hub, a brake drum secured to said hub and having a brake flange and a second flange reinforcing said brake flange and forming therewith a recess, and means for balancing the assembly, including a weight in the recess and secured to said reinforcing flange.

4. In a vehicle wheel hub and brake drum assembly, the combination of a hub, a brake drum secured to said hub and having a brake flange and a curled flange for reinforcing said brake flange forming an annular recess, and means for balancing the assembly, including a weight located in the recess and secured to said reinforcing flange.

5. In a vehicle wheel hub and brake drum assembly, the combination of a hub, a brake drum secured to said hub and having a brake flange provided at its edge with a curled reinforcing flange, and balancing means secured within said reinforcing flange and concealed thereby.

6. In a vehicle wheel, a brake drum having a brake flange, and a flange for reinforcing said brake flange constructed to balance the brake drum.

7. In a vehicle wheel, a brake drum assembly including a brake flange, a flange for reinforcing said brake flange, and means for balancing the assembly including a weight secured to said reinforcing flange.

8. In a vehicle wheel, a brake drum assembly including a brake flange terminating in a curled reinforcing flange cooperating with said brake flange to form a recess, and means for balancing said assembly including a weight secured within the recess aforesaid.

In testimony whereof I affix my signature.

WILLIAM N. BOOTH.